US 9,940,210 B2

(12) United States Patent
Jagtiani et al.

(10) Patent No.: US 9,940,210 B2
(45) Date of Patent: *Apr. 10, 2018

(54) HEALING CLOUD SERVICES DURING UPGRADES (71) Applicant: Microsoft Technology Licensing, LLC, Redmond, WA (US)

(72) Inventors: Gaurav Jagtiani, Bellevue, WA (US); Abhishek Singh, Redmond, WA (US); Ajay Mani, Woodinville, WA (US); Akram Hassan, Sammamish, WA (US); Thiruvengadam Venketesan, Redmond, WA (US); Saad Syed, Redmond, WA (US); Sushant Pramod Rewaskar, Redmond, WA (US); Wei Zhao, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/752,090

(22) Filed: Jun. 26, 2015

(65) Prior Publication Data

US 2015/0293821 A1  Oct. 15, 2015

Related U.S. Application Data (63) Continuation of application No. 13/741,569, filed on Jan. 15, 2013, now Pat. No. 9,141,487.

(51) Int. Cl.
*G06F 11/00* (2006.01)
*G06F 11/20* (2006.01)
(Continued)

(52) U.S. Cl.
CPC ........ *G06F 11/203* (2013.01); *G06F 11/0712* (2013.01); *G06F 11/1433* (2013.01);
(Continued)

(58) Field of Classification Search
CPC .. G06F 11/14–11/1433; G06F 11/20–11/2053; G06F 9/45533–9/45558;
(Continued)

(56) References Cited

U.S. PATENT DOCUMENTS 6,816,905 B1   11/2004   Sheets et al.
7,239,605 B2   7/2007   Dinker et al.
(Continued)

FOREIGN PATENT DOCUMENTS

CN   101398770   4/2009
CN   101800762   8/2010
(Continued)

OTHER PUBLICATIONS

"International Preliminary Report on Patentability Issued in PCT Patent Application No. PCT/US2014/011365", dated Jun. 17, 2015, 9 Pages.
(Continued)

*Primary Examiner* — Jason B Bryan
(74) *Attorney, Agent, or Firm* — Workman Nydegger (57) ABSTRACT Embodiments described herein are directed to migrating affected services away from a faulted cloud node and to handling faults during an upgrade. In one scenario, a computer system determines that virtual machines running on a first cloud node are in a faulted state. The computer system determines which cloud resources on the first cloud node were allocated to the faulted virtual machine, allocates the determined cloud resources of the first cloud node to a second, different cloud node and re-instantiates the faulted virtual machine on the second, different cloud node using the allocated cloud resources.

7 Claims, 4 Drawing Sheets (51) Int. Cl.
  *G06F 11/07* (2006.01)
  *G06F 11/14* (2006.01)
  *H04L 29/08* (2006.01)
  *G06F 9/445* (2018.01)

(52) U.S. Cl.
  CPC .......... *G06F 11/1484* (2013.01); *G06F 11/20* (2013.01); *G06F 11/2023* (2013.01); *H04L 67/10* (2013.01); *G06F 8/65* (2013.01); *G06F 2201/84* (2013.01)

(58) Field of Classification Search
  CPC ............ G06F 2009/45562–2009/45595; G06F 11/07–11/0712; G06F 11/203; G06F 11/1484; G06F 11/2023; H04L 67/10
  See application file for complete search history.

(56) References Cited

U.S. PATENT DOCUMENTS

| | | | |
|---|---|---|---|
| 7,971,094 B1* | 6/2011 | Benn | G06F 11/2025 714/11 |
| 8,069,190 B2 | 11/2011 | McColl et al. | |
| 8,132,043 B2 | 3/2012 | Dash et al. | |
| 8,572,237 B2 | 10/2013 | Ginkel et al. | |
| 2005/0091396 A1* | 4/2005 | Nilakantan | H04L 45/04 709/232 |
| 2010/0153481 A1* | 6/2010 | Ginkel | G06F 15/16 709/201 |
| 2011/0035620 A1* | 2/2011 | Elyashev | G06F 11/0727 714/48 |
| 2011/0202795 A1 | 8/2011 | Marathe et al. | |
| 2011/0231696 A1* | 9/2011 | Ji | G06F 11/1438 714/3 |
| 2011/0276675 A1 | 11/2011 | Singh et al. | |
| 2012/0066541 A1* | 3/2012 | Dournov | G06F 11/0709 714/3 |
| 2012/0102481 A1* | 4/2012 | Mani | G06F 11/0757 717/172 |
| 2012/0110186 A1 | 5/2012 | Kapur et al. | |
| 2014/0007097 A1* | 1/2014 | Chin | G06F 9/45533 718/1 |

FOREIGN PATENT DOCUMENTS

| | | |
|---|---|---|
| CN | 102035662 | 4/2011 |
| CN | 102394774 | 3/2012 |
| CN | 102541987 | 7/2012 |

OTHER PUBLICATIONS

Chen, et al., "SHelp-Automatic Self-Healing for Multiple Application Instances in a Virtual Machine Environment", In Proceedings of IEEE International Conference on Cluster Computing, Sep. 20, 2010, 10 pages.

"Partial International Search Report for PCT Application No. PCT/US2014/011365", dated May 8, 2014, Filed Date: Jan. 14, 2014, 6 Pages.

International Search Report & Written Opinion for PCT Application No. PCT/US2014/011365, dated Jul. 2014, Filed Date: Jan. 14, 2014, 22 pages.

"Non-Final Office Action Issued in U.S. Appl. No. 13/741,569", dated Jan. 2, 2015, 17 Pages.

"Notice of Allowance Issued in U.S. Appl. No. 13/741,569", dated Mar. 17, 2015, 13 Pages.

"Second Written Opinion Issued in PCT Application No. PCT/US2014/011365", dated Mar. 20, 2015, 7 Pages.

"Search Report Issued in European Patent Application No. 16165665.7", dated Jul. 25, 2016, 7 Pages.

Chinese Office Action issued in CN Patent Application No. 201480004969.4 dated May 16, 2017.

"Second Office Action and Search Report Issued in Chinese Patent Application No. 201480004969.4", dated Jan. 29, 2018, 12 Pages.

* cited by examiner

HEALING CLOUD SERVICES DURING UPGRADES

CROSS-REFERENCE TO RELATED APPLICATIONS

This application is a continuation of U.S. patent application Ser. No. 13/741,569 filed on Jan. 15, 2013, entitled "Healing Cloud Services During Upgrades," which application is incorporated herein by reference.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

Some software applications are designed for deployment and processing on the cloud. Such applications are often referred to as distributed applications. These distributed applications are configured to run on many different physical and/or virtual computer systems. As such, many different points of failure (both on the hardware side and on the software side) are introduced.

BRIEF SUMMARY

Embodiments described herein are directed to migrating affected services away from a faulted cloud node and to handling faults during an upgrade. In one embodiment, a computer system determines that virtual machines running on a first cloud node are in a faulted state. The computer system determines which cloud resources on the first cloud node were allocated to the faulted virtual machine, allocates the determined cloud resources of the first cloud node to a second, different cloud node and re-instantiates the faulted virtual machine on the second, different cloud node using the allocated cloud resources.

In another embodiment, a computer system pauses an initiated service upgrade that is configured to upgrade virtual machines from an older service version to a newer service version by upgrading each virtual machine within a set of virtual machines specified in an upgrade domain before proceeding to the next upgrade domain. The virtual machines may be located in different upgrade domains. The computer system then determines that a virtual machine instance has faulted and further determines whether the faulted virtual machine instance is in an upgrade domain that is currently being upgraded, in an upgrade domain that has already been upgraded, or is in an upgrade domain that has yet to be upgraded to the newer service version. The computer system also restores the faulted virtual machine instance using either the newer service version or the older service version, based on the determination, and resumes the initiated service upgrade.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to migrating affected services away from a faulted cloud node and to handling faults during an upgrade. In one embodiment, a computer system determines that virtual machines running on a first cloud node are in a faulted state. The computer system determines which cloud resources on the first cloud node were allocated to the faulted virtual machine, allocates the determined cloud resources of the first cloud node to a second, different cloud node and re-instantiates the faulted virtual machine on the second, different cloud node using the allocated cloud resources.

In another embodiment, a computer system pauses an initiated service upgrade that is configured to upgrade virtual machines from an older service version to a newer service version by upgrading each virtual machine within an upgrade domain before proceeding to the next upgrade domain. The virtual machines may be located in different upgrade domains. The computer system then determines that a virtual machine instance has faulted and further determines whether the faulted virtual machine instance is in an upgrade domain that is currently being upgraded, in an upgrade domain that has already been upgraded, or is in an upgrade domain that has yet to be upgraded to the newer service version. The computer system also restores the faulted virtual machine instance using either the newer service version or the older service version, based on the determination, and resumes the initiated service upgrade.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (AS SPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Figure 1:
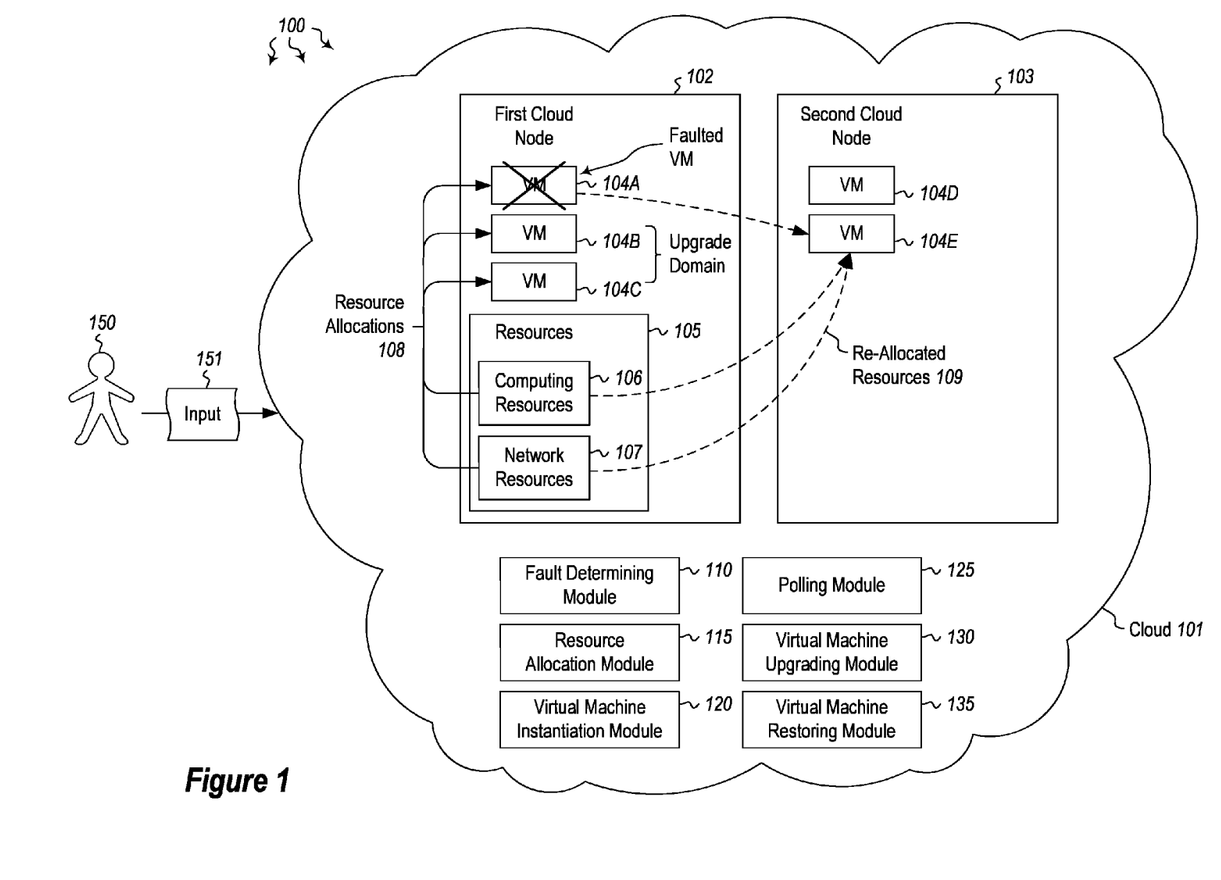
FIG. 1 illustrates a computer architecture in which embodiments described herein may operate including migrating affected services away from a faulted cloud node.

FIG. 1 illustrates a computer architecture 100 in which at least one embodiment may be employed. Computer architecture 100 includes cloud computer system 101. Cloud computer system 101 may include multiple different nodes including first node 102 and second node 103. Each cloud computing node may include one or more processors and system memory. Each cloud node may be configured to run one or more virtual machines 104A-E. These virtual machines may, themselves, run software applications. These applications may belong to a tenant or user 150 who is using the cloud to host their applications. In some cases, the user 150 may be able to manage their applications on the cloud (or at least certain aspects thereof) by providing input 151 through an interface.

The architecture 100 of FIG. 1 provides the ability to migrate individual service instances from faulted nodes or virtual machines (VMs) to healthy nodes or virtual machines (e.g. from faulted VM 104A on node 102 to VM 104E on node 103). An allocation process is implemented that respects both the current allocation and the model of the service established between the user 150 and the cloud. The cloud only performs incremental allocation for the instances that need migration. The system of FIG. 1 also provides the ability to update network connectivity of all the cloud nodes across the cloud's data center using an update blast after migration. The system also provides the ability to notify any platform as a service (PaaS) service instances that a topology change has occurred using the update blast (topology changes may occur when a node or VM goes down and another node or VM is used in its place). The system thus reduces the time to heal in response to faults, as well as rapidly notifies service instances of any topology changes. These healing operations may be performed during application upgrade rollouts, increasing application availability.

Embodiments described herein further describe an incremental allocation scheme for service instance migration. As used herein, "allocation" refers to allocation of computing resources and considers factors like disk, memory and other hardware requirements for the instance to migrate. Additionally, the term refers to allocation of network resources like IP addresses. Implementations may run in two modes: full service allocation and instance allocation. The resource allocation module 115 of cloud 101 may be provided with a set of constraints obtained by combining information from any existing resource allocation and any associated service models, along with specific instances that need migration. If no constraints and no specific instances are provided, the resource allocation module 115 runs in full service allocation mode.

Once allocation is complete, actual migration of the faulted application (i.e. the service instance) can occur. This involves preparing a new VM or cloud node with the allocated resources (compute and networking) and deploying the service instance application on the newly prepared machine. To update network connectivity after migration, the system implements an update blast, which propagates network changes across all of the nodes of the cloud computing system 101. A controller platform service may be used that initiates the migration and communicates with a network agent service running on each node. After instance allocation is complete, the controller sends the new network information to each node that is running the application service being healed. In response, the network agent reprograms one or more virtual switch filtering rules to allow the new instance to communicate with existing instances. The network connectivity update operation can occur in parallel with the actual migration. In addition, if the service contract requires that a domain name system (DNS) host name be assigned to the migrated application service instance, the DNS server mapping corresponding to the migrated service is updated with the new IP address.

Once network connectivity for the healed service is restored, the cloud computing system 101 provides a notification to all (or some, as defined by the service contract) service instances. The network connectivity can be restored in at least two different ways: 1) The controller platform service notifies the application and provides it IP addresses of the migrated instances. 2) The controller platform service updates DNS mappings on a DNS server. The polling module 125 of the cloud computing system 101 polls for updates to DNS mappings. Once an updated IP is found, an event is sent to the application service instance.

In some cases, the event is sent to all service instance application runtimes in no particular order, with no intention of delays between event delivery across instances (i.e. a notification blast). The event contains context on the new IP addresses of migrated instances. These DNS mappings are then updated during the network connectivity update step. These steps are collectively referred to herein as an "instance migration".

Figure 4A:
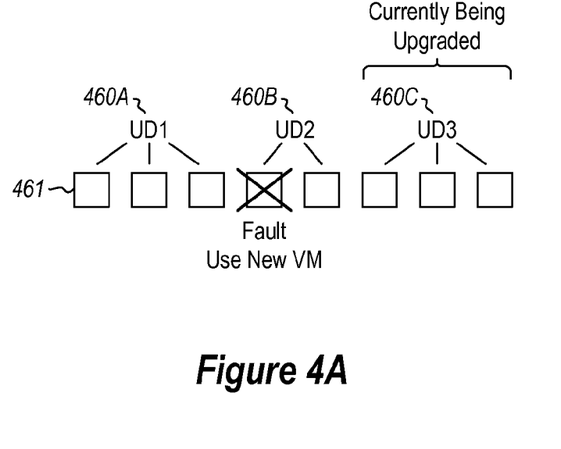
FIGS. 4A-4C illustrate embodiments faults are handled during an application upgrade.
Figure 4B:
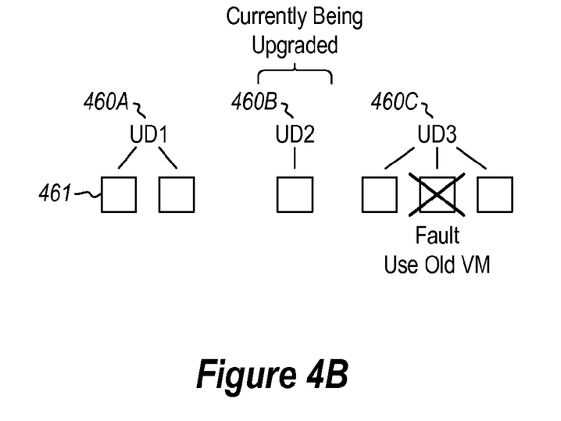
Figure 4C:
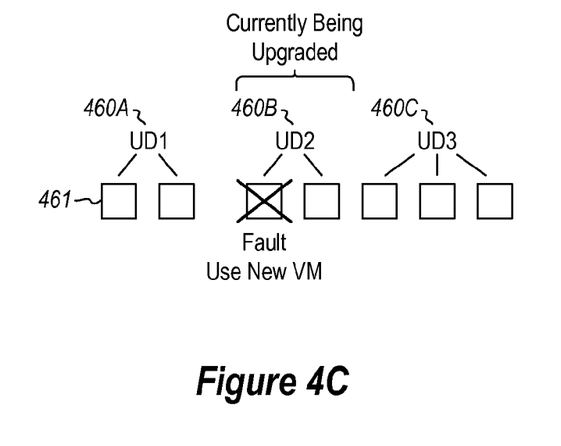

As will be explained further below with regard to FIGS. 4A-4C, if a fault is detected during an application or VM upgrade, the fault could occur in one of at least three ways: 1) the upgrade domain (UD) of the faulted instance is less than the DU that is currently being upgraded (i.e. the "current UD"). In this case, the faulted instance would already have the customer update applied to it, and an instance migration would be performed using the latest application environment. 2) The UD of the faulted instance is greater than the current UD. In this case, the faulted instance is running an older application version. An instance migration is performed, and the service instance is restored using the older application environment. This ensures that the customer/service does not see a new application version in an unexpected (non-upgraded) UD.

Furthermore, any data associated with the new application version that was already staged on the now faulted (virtual) machine is also repopulated/migrated on the new (virtual) machine. Any resources that were allocated to the now faulted machine for the upgrade, should also be migrated to the new machine. This ensures that when the upgrade rollout engine reaches the healed UD, the new application version can be seamlessly implemented. 3) The UD of the faulted instance is equal to the current UD. In this case, the cloud computing system 101 is in the process of applying the newest upgrade to the VMs in that UD. In such cases, an instance migration is performed using the latest application version.

In the above cases, the ongoing rollout may be pre-empted so that healing can take priority. This ensures high availability for the application, as it minimizes downtime in more than one UD. Pre-emption implies that the upgrade rollout will be suspended. However, ongoing tasks (image deployment, VM creation, etc.) can continue while healing occurs. Once healing is complete, the rollout can be resumed. If the customer opts to have manual control over upgrading UDs, the cloud computing system can behave in two ways: 1) it can block the manual UD upgrade, stating that healing is ongoing. An option to force a UD upgrade even in this condition can be provided. 2) The cloud computing system can allow the UD upgrade and let the customer control interaction with healing. In such cases, state regarding the healing process is exposed externally, so the customer 151 can make an informed decision.

In some embodiments, a customer upgrade may be initiated during service application healing. In such cases, the upgrade would start in a pre-empted state and any instance migration would restore the migrated instance with the older application version. Once healing completes, the upgrade can resume. To ensure high availability, a healing task can take priority over an ongoing UD upgrade. The UD upgrade can be suspended in a similar fashion to a customer upgrade. If a service's virtual machine is already undergoing an upgrade, and a fault occurs on a different VM or node for the same service, healing can proceed either individually or in parallel, as the healing is trying to recover an already faulted node. These concepts will be explained further below with regard to methods 200 and 300 of FIGS. 2 and 3, respectively.

Figure 2:
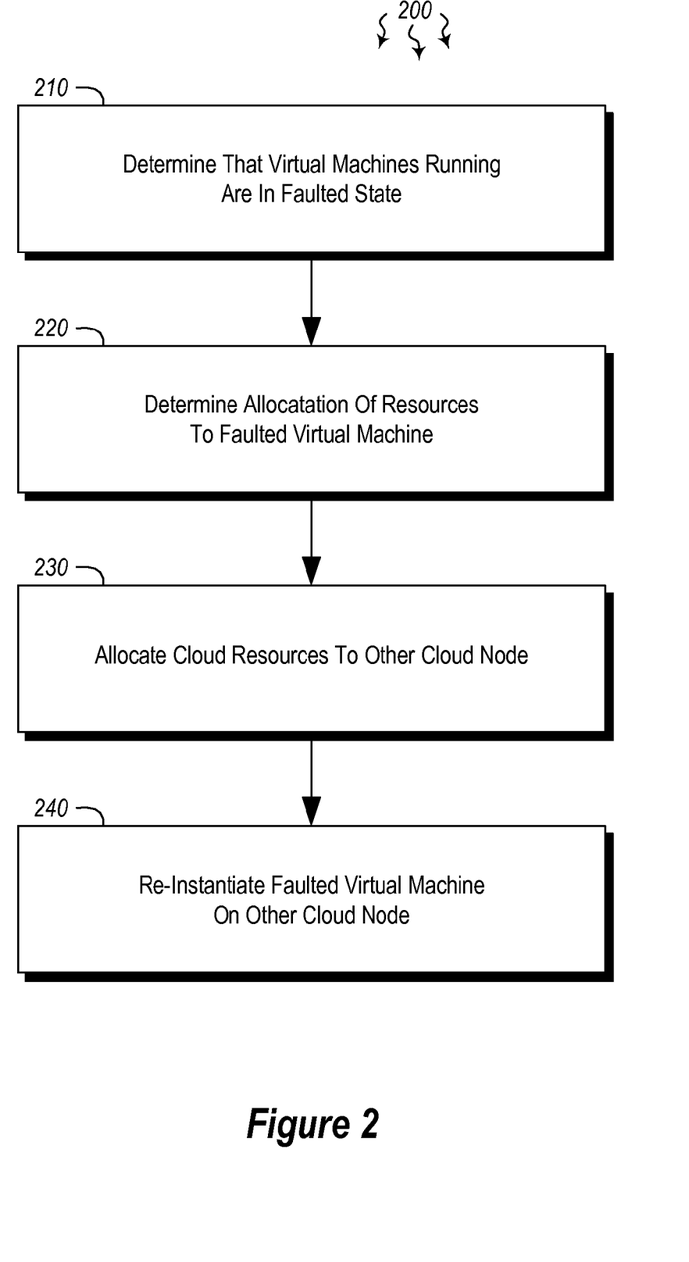
FIG. 2 illustrates a flowchart of an example method for migrating affected services away from a faulted cloud node.
Figure 3:
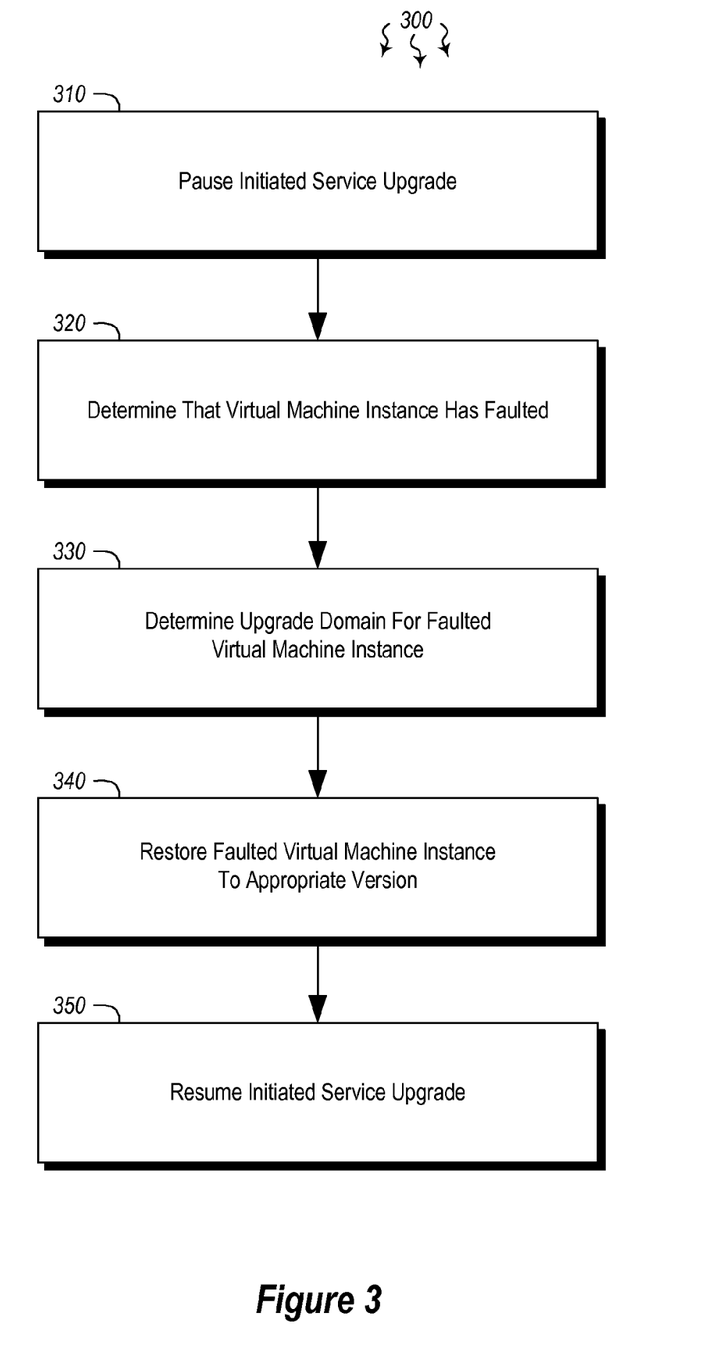
FIG. 3 illustrates a flowchart of an example method for handling faults during an upgrade.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for migrating affected services away from a faulted cloud node. The method 200 will now be described with frequent reference to the components and data of environment 100.

Method 200 includes an act of determining that one or more virtual machines running on a first cloud node are in a faulted state (act 210). For example, fault determining module 110 may determine that virtual machine 104A has faulted. The fault may be a software fault or a hardware fault. The fault may be a complete failure or a partial failure of either the hardware or software. Moreover, references to a faulting VM will also be understood to cover references to a faulting application or application service. The polling module 125 may be used to determine that one or more virtual machines running on a first cloud node are in a faulted state. The polling module may periodically poll each node for faults at a specified polling rate. If the node or VM or application service fails to respond to the poll, a fault may be assumed to have occurred.

Method 200 includes an act of determining which cloud resources on the first cloud node were allocated to the faulted virtual machine (act 220). The resource allocation module 115 may determine which computing (106), network (107) or other resources were allocated to the faulted virtual machine 104A. The computing resources 106 may include processors, processing cores, memory, disk storage or other computing resources. The network resources 107 may include network cards or a specified amount of network bandwidth or other networking resources. Other resources may also be allocated by the resource allocation module 115. The cloud resources may be allocated according to a user-specified service model. Accordingly, if a user pays for a certain level of service, or a certain amount of processing, networking or other resources, the allocation may occur in-line with the established service model. In some cases, the user-specified service model may specify how many cloud resources are to be allocated to each of the user's virtual machines.

Method 200 includes an act of allocating the determined cloud resources of the first cloud node to a second, different cloud node (act 230). Thus, the resources that were being used for the faulted VM 104A can be re-allocated 109 to, for example, VM 104E (or to a new node, or to a new application within a VM). The faulted VM, node or application may then be re-instantiated (e.g. by module 120) on the second, different cloud node using the allocated cloud resources (act 240). Accordingly, VM 104E can be run on the second node 103 of cloud 101, and can be run using the re-allocated resources 109 that were previously being used to run the now faulted VM 104A.

In some embodiments, each virtual machine is part of an upgrade domain (UD) that includes at least one virtual machine. Virtual machines may thus be upgraded according to their UD. As such, VMs may be migrated from the first cloud node 102 to the second cloud node 103 as part of an upgrade initiated through the UD. Thus, for example, if UD1 (460A from Figure A) is to be upgraded from an older version to a newer version, each of the VMs (461) in UD1 is updated with that specified update. This will be explained further below with regard to FIGS. 4A-4C. It should be understood that UDs may include substantially any number of VMs, regardless of the numbers shown in the Figures.

Once VMs have been migrated, the topology of the cloud 101 will have changed. The new cloud network topology that includes the re-instantiated virtual machines may be communicated to the other virtual machines in the upgrade domain. These VMs may also be notified that the fault occurred, and may be notified of where the fault occurred. Still further, the VMs may be notified of the current cloud resource allocation and notified that a new VM has been instantiated by VM instantiation module 120. The new network topology may include updated IP addresses, DNS names or other network updates.

FIG. 3 illustrates a flowchart of a method 300 for handling faults during an upgrade. The method 300 will now be described with frequent reference to the components and data of environment 100, as well as the components of FIGS. 4A-4C.

Method 300 includes an act of pausing an initiated service upgrade, the service upgrade being configured to upgrade one or more virtual machines from an older service version to a newer service version, the virtual machines being located in one or more different upgrade domains (UDs), by upgrading each virtual machine within an upgrade domain before proceeding to the next upgrade domain (act 310). Thus, in a scenario where a service upgrade has already been initiated by VM upgrading module 130, that service upgrade may be paused or suspended temporarily. The service upgrade may be applied UD by UD in sequential or some other specified order. Thus, in FIG. 4A, if the upgrades are being applied in sequential order, UDs 1 (460A) and 2 (460B) have already been upgraded, as UD3 (460C) is currently being upgraded.

Method 300 then includes an act of determining that a virtual machine instance has faulted (act 320). Fault determining module 110 may determine that, for example, VM 104A has had a software and/or hardware fault and is, for example, no longer responding to polls sent out by polling module 125. The cloud 101 may determine whether the faulted virtual machine instance (e.g. 104A) is in an upgrade domain that is currently being upgraded, is in an upgrade domain that has already been upgraded, or is in an upgrade domain that has yet to be upgraded to the newer service version (act 330). Then, based on that determination, the virtual machine restoring module 135 may restore the faulted VM instance using either the newer service version or the older service version, based on which VM faulted and which UD it was in (act 340). After the VM has been restored, the service upgrade is re-initiated (act 350).

If the fault determining module 110 determines (as in FIG. 4A) that the faulted virtual machine instance is in UD2, which has already been upgraded, the newer, upgraded service version is used to restore the faulted virtual machine instance. Indeed, because the VM was already upgraded, it is restored to its upgraded state.

If fault determining module 110 determines (as in FIG. 4B) that the faulted virtual machine instance is in UD3, which has yet to be upgraded to the newer service version, then the older service version is used to restore the faulted virtual machine instance. Because UD2 is currently being upgraded, and because the UDs are being upgraded in sequential order (in this example), UD3 (460C) has not yet been updated, and restoring to a newer version may cause problems. As such, the VM is restored to the older version, and is then later upgraded when UD3 is upgraded to the newer version.

If fault determining module 110 determines (as in FIG. 4C) that the faulted virtual machine instance is in an upgrade domain that is currently being upgraded (i.e. UD2 (460B)), the newer, upgraded service version is used to restore the faulted virtual machine instance. As UD2 is currently being upgraded, the newer version will be expected by the user and other applications. Accordingly, the faulted VM is restored with the upgraded version. In some cases, virtual switch filtering rules may be reprogrammed to allow the newer, upgraded virtual machine instance to communicate with various other existing virtual machine instances. Any network updates (e.g. to IP addresses and domain names) may occur in parallel with virtual machine upgrades. The network changes may then be blasted out to the other VMs in the UDs of cloud 101. Thus, VMs may be healed during upgrades, and other nodes of the cloud may be apprised of any changes to network topology using a blast communication.

Accordingly, methods, systems and computer program products are provided which migrate affected services away from a faulted cloud node. Moreover, methods, systems and computer program products are provided which handle faults during a virtual machine upgrade. Changes to network topology are blasted out after the fault has been resolved. In this manner, cloud healing may occur in a substantially seamless manner, regardless of whether the fault occurs before, after or during an upgrade.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer-implemented method for handling faults during an upgrade, the computer-implemented method being performed by one or more processors when executing computer-executable instructions for the method, the computer-implemented method comprising acts of:
   pausing an initiated service upgrade, the service upgrade being configured to upgrade one or more virtual machines from an older service version to a newer service version, the virtual machines being located in one or more different upgrade domains, by upgrading each virtual machine within an upgrade domain before proceeding to the next upgrade domain;
   determining that a virtual machine instance has faulted;
   determining whether the faulted virtual machine instance is in an upgrade domain that is currently being upgraded, is in an upgrade domain that has already been upgraded, or is in an upgrade domain that has yet to be upgraded to the newer service version;
   creating a restored virtual machine instance by restoring the faulted virtual machine instance using at least one of the newer service version and the older service version, based on the determination;
   reprogramming one or more virtual switch filtering rules to allow the restored virtual machine instance to communicate with one or more other existing virtual machine instances; and
   resuming the initiated service upgrade.

2. The computer-implemented method of claim 1, wherein it is determined that the faulted virtual machine instance is in an upgrade domain that has already been upgraded, and wherein the newer, upgraded service version is used to restore the faulted virtual machine instance.

3. The computer-implemented method of claim 1, wherein it is determined that the faulted virtual machine instance is in an upgrade domain that has yet to be upgraded to the newer service version, and wherein the older service version is used to restore the faulted virtual machine instance.

4. The computer-implemented method of claim 3, further comprising upgrading the faulted virtual machine instance to the newer version when that instance's upgrade domain is being upgraded.

5. The computer-implemented method of claim 1, wherein it is determined that the faulted virtual machine instance is in an upgrade domain that is currently being upgraded, and wherein the newer, upgraded service version is used to restore the faulted virtual machine instance.

6. The computer-implemented method of claim 1, wherein network updates occur in parallel with virtual machine upgrades.

7. The computer-implemented method of claim 6, wherein the network updates include reassigning a new domain name system (DNS) name to the newer, upgraded virtual machine instance.

* * * * *